July 1, 1941.  R. P. HEUER  2,247,376
REFRACTORY BRICK PROCESS
Filed March 28, 1938   3 Sheets-Sheet 1
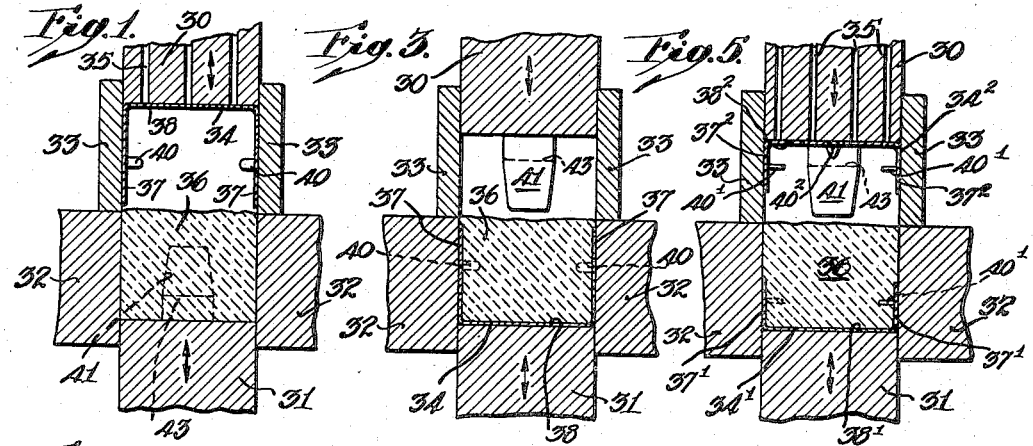
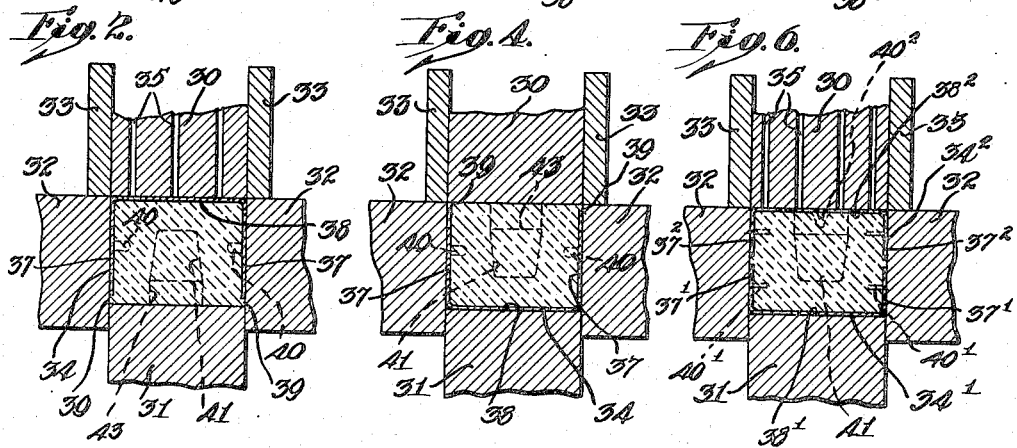
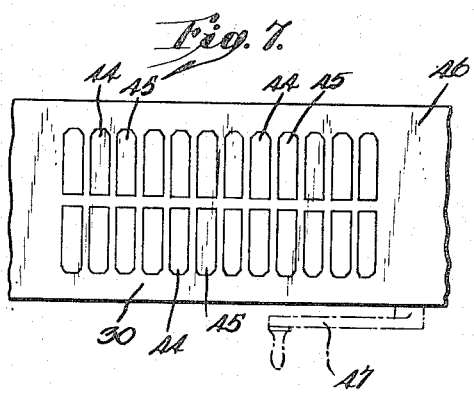
Witnesses:
Inventor
Russell P. Heuer
Attorneys.

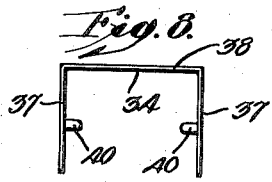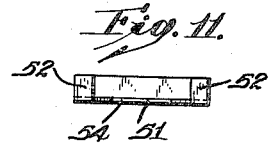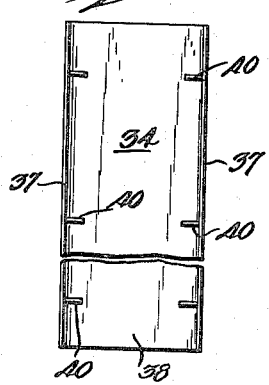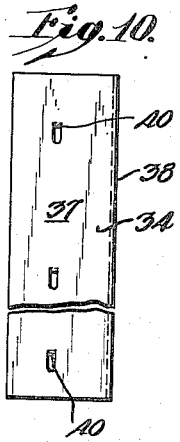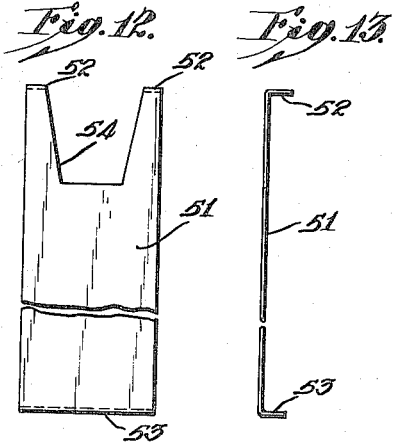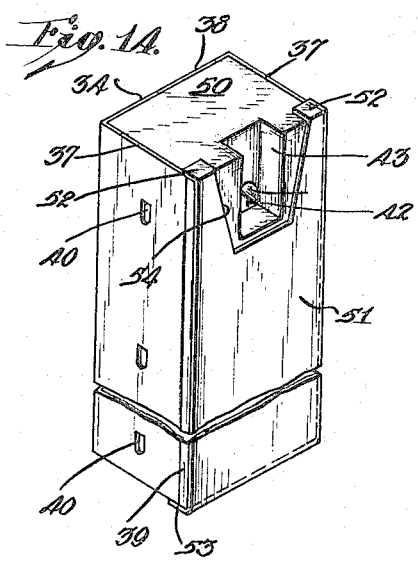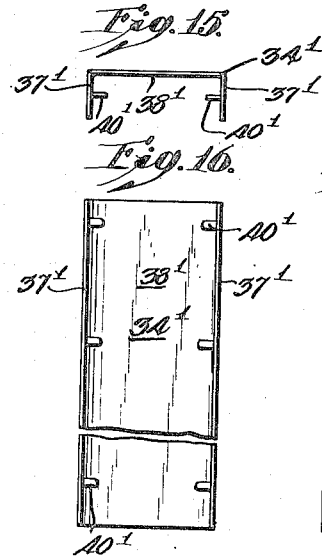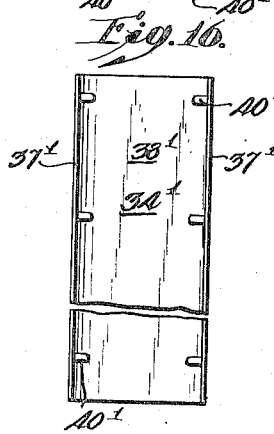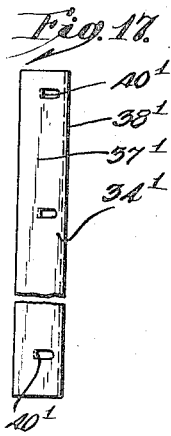

July 1, 1941.                    R. P. HEUER                    2,247,376
                          REFRACTORY BRICK PROCESS
                          Filed March 28, 1938            3 Sheets-Sheet 3
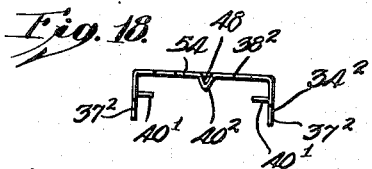
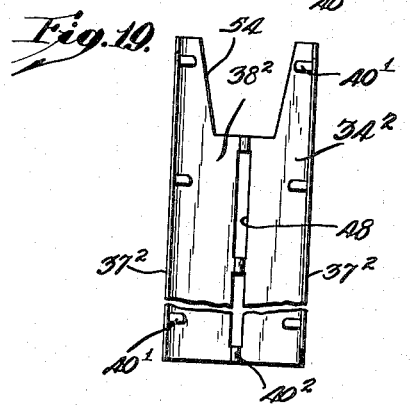
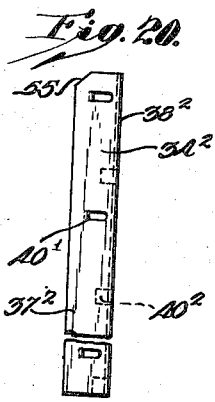
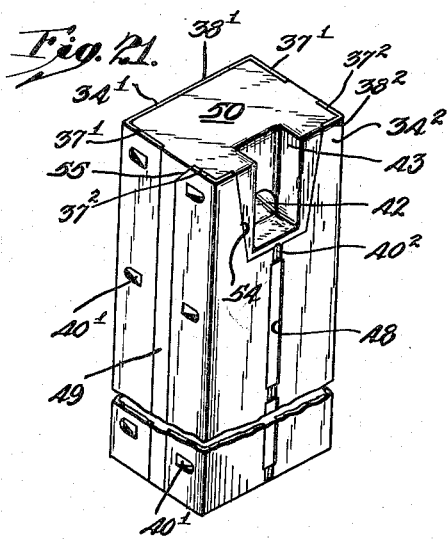
Inventor
Russell P. Heuer Patented July 1, 1941

2,247,376

UNITED STATES PATENT OFFICE 2,247,376

REFRACTORY BRICK PROCESS

Russell Pearce Heuer, Bryn Mawr, Pa., assignor to General Refractories Company, a corporation of Pennsylvania Application March 28, 1938, Serial No. 198,426

10 Claims. (Cl. 25—156)

The invention relates to processes of molding basic refractory brick, particularly processes of molding basic brick provided with spacer plates and intended for use in basic suspended furnace roofs or walls.

This application has been divided and the claims relating to the brick structure have been included in my U. S. application Serial No. 238,-505, filed November 3, 1938, for Refractory brick structure.

A purpose of the invention is to mold brick by direct pressure against a lateral face and, concurrently with the molding, fasten oxidizable metallic spacers on a lateral face or faces of the brick.

A further purpose is to apply direct pressure through a metallic spacer to mold a brick and to affix the spacer to the brick.

A further purpose is to apply to a brick a U-shaped oxidizable metallic spacer which covers the preponderant part of one face and parts of two other adjoining faces of the brick, embedding interlocking projections or tabs from the spacer in the brick as the brick is molded.

A further purpose is to mold a brick and mold a U-shaped oxidizable metallic spacer plate on the brick by applying pressure between that face of the plate which is at the base of the U and the open side of the U.

A further purpose is concurrently to mold a brick and affix oxidizable metallic spacer plates to the brick by applying molding pressure through the base of the U of each of two U-shaped spacer plates whose open sides face toward one another.

A further purpose is longitudinally to weaken a spacer plate which is in contact with one of the dies of a brick molding press to permit lateral pressure adjustment and, where a slot is used, to allow the escape of air from the brick during molding.

A further purpose is to slot a U-shaped oxidizable metallic spacer plate longitudinally of the base of the U, leaving connecting prongs, to divert the connecting prongs into the interior of the U and to embed the connecting prongs in the brick during molding.

A further purpose is to hold a U-shaped oxidizable metallic spacer plate by embedding projections from the sides of the U in the brick during molding.

Further purposes appear in the specification and in the claims.

The drawings illustrate a few of the many possible embodiments of the invention, the forms shown being selected from the standpoints of convenience in illustration and satisfactory explanation of the principles involved.

Figures 1 to 6 are diagrammatic illustrations of molding presses, Figures 1, 3 and 5 showing the platens or dies separated, near the beginning of the molding cycle, and Figures 2, 4 and 6 showing the platens or dies together, at the completion of the molding cycle. Figures 1 and 2 show application of the spacer plate from the top, Figures 3 and 4 show application of the spacer plate from the bottom, and Figures 5 and 6 show application of spacer plates from both the top and the bottom.

Figure 7 is a fragmentary bottom plan view of an alternative upper die equipped with a magnetic holder.

Figures 8, 9 and 10 are respectively top plan, front elevation and side elevation views of a U-shaped spacer plate of the type shown in Figures 1 and 2, applied to the upper die, and in Figures 3 and 4, applied to the lower die.

Figures 11, 12 and 13 are respectively top plan, front elevation and side elevation views of a spacer plate which may be applied to the brick of Figures 1 and 2 or 3 and 4 after molding.

Figure 14 is a perspective view of a completed basic suspended roof brick as produced in accordance with the process of Figures 1 and 2 or 3 and 4.

Figures 15, 16 and 17 are respectively top plan, front elevation and side elevation views of a U-shaped spacer plate which rests on the bottom die in Figures 5 and 6.

Figures 18, 19 and 20 are respectively top plan, front elevation and side elevation views of a U-shaped spacer plate held by the upper die in Figures 5 and 6.

Figure 21 is a perspective view of a completed brick produced according to the process of Figures 5 and 6.

In the drawings like numerals refer to like parts.

As explained in Russell Pearce Heuer U. S. patent application Serial No. 707,084, filed January 18, 1934, for Suspended furnace roof, Patent No. 2,154,813, granted April 18, 1939, very effective suspended furnace roofs can be obtained by hanging basic refractory bricks side by side and interspersing oxidizable metallic spacer plates between the bricks. The spacers oxidize near the hot face of the roof and ordinarily for some distance back of the hot face. As the oxide occupies a greater volume than the original spacer metal, growth of the spacers results from the oxidation and the spacer oxide rigidly unites with the adjoining faces of the bricks, exerts a mild lateral pressure on the bricks, and seals the joints between the bricks. Whereas before growth the bricks and the spacers are usually relatively loosely associated and the individual bricks and spacers are capable of adjusting their relative positions as the furnace heats up, the oxidation of the spacers causes integration of the roof or of large units of the roof.

In construction of basic suspended furnace roofs of the type referred to, certain difficulties have been encountered. The separate operation of applying the individual spacer plates to the preformed bricks during construction of the roof has resulted in increased labor cost of building the roof.

In the previous constructions there has not always been close conformity between the brick and the spacer plate, due in some cases to irregularities in the brick and in other cases to unintentional bending of the spacer plate prior to or during assembly of the roof.

On an experimental basis, the present inventor has attempted to attach the plates physically to the premolded brick by adhesive or by resiliently gripping the brick by the plate. This has not in all cases been fully satisfactory because in the assembly of the roof there have been points where the spacer plate on one brick contacts the spacer plate of an adjoining brick instead of being in contact with the lateral face of the adjoining brick. Thus after oxidation, in order to integrate the roof, there must be not only coalescence between the brick and the plate but also welding or coalescence between two plates. The extra spacer plate thickness increases the danger that the plates will melt out rather than oxidize, since in many of the furnaces employing the roofs of the present invention such as open hearth steel furnaces, the operating temperature of the furnace is above the melting point of the iron or steel spacers. Furthermore separate application of many spacer plates to premolded bricks is cumbersome, and not always very effective.

In accordance with the present invention, the spacer plate or plates will not in most cases be applied to a preformed or premolded brick as in Patent No. 2,154,813 aforesaid, but the spacer plate or plates will be formed as part of the brick at the time of molding the brick. Applicant will not, however, pack in the refractory through the ends of a closed casing as in Maccallum U. S. Patent No. 1,106,725, granted August 11, 1914, for Furnace wall construction. This patent discloses a brick not suitable for and never applied to suspended furnace roofs.

In accordance with the present invention, molding pressure is applied through the spacer plate. In effect, the spacer plate acts with the die for the purpose of molding the brick, and is secured to the brick during molding as by suitable interlocking means embedded in the brick.

While the best use of the invention will probably be in basic suspended furnace roofs, certain aspects of the invention are applicable in furnace walls.

This method of molding by applying pressure through the spacer plate itself assures absence of voids between the spacer plate and the brick, gives uniform pressure distribution, products a smooth brick surface and very firmly unites the spacer plate to the brick.

It will be understood that the molding press could of course have dies moving horizontally instead of vertically, or that the lower die or both the lower and upper dies might move, instead of only the upper die. For convenience, however, and as illustrating a typical brick press, Figures 1 to 6 show a construction in which the upper die is movable, and the lower die need not be. The press of any suitable sort, mechanical or hydraulic, comprises an upper die 30, a lower die 31, mold sides or deckles 32 and guides 33 for the upper die.

A spacer plate 34 of generally U-shape (the U inverted) is shown in Figure 1 supported by the upper die, as through the application of suction to the passages 35. A basic brick mix 36 is shown in the mold space. As will be seen in Figure 2, relative movement of the dies toward one another results in bringing the arms 37 of the spacer plate 34 into position at the sides of the brick, while the brick mix (at first loose) fills the space inside the arms 37 of the U and comes in contact with the base 38 of the U, which is held by the upper die 30. Once the base 38 of the U is firmly in contact with the brick mix, further relative movement of the dies toward one another compresses the brick mix within a space whose top and whose upper side portions are defined by the spacer plate 34. The arms 37 are preferably not as long as the width of the side of the brick, so as not to crush the arms during molding. Thus there is a portion 39 of the side of the brick not covered by the spacer plate.

It will be understood that, while the brick mix occupies the space between the arms of the U spacer plate, it fits around the interlocking projections or tabs 40 punched out and bent inward from the spacer plate and, when the brick is molded, the projections 40 are embedded in the brick as shown in Figure 2.

One of the dies, in this case the lower die, carries the male projection 41 forming the hook engaging depression 42 and the hanger slot 43 shown more in detail in Figures 14 and 21 to 25.

The brick mix employed may, for example, be magnesia as described in Heuer Patent No. 2,154,813 aforesaid, or as described in Russell Pearce Heuer U. S. Patent No. 1,859,512, granted May 24, 1932, for Refractory and method of making it, or in U. S. Patent No. 1,992,482, granted February 26, 1935, for High-pressure brick containing magnesia and process of making the same. On the other hand, a chrome brick mix may be employed as described in Russell Pearce Heuer U. S. Patent No. 1,992,483, granted February 26, 1935, for High-pressure chrome refractory. Chrome-magnesia brick may be employed as described in Russell Pearce Heuer U. S. Patent No. 2,087,107, granted July 13, 1937, for Chrome magnesia refractory and method or in Russell Pearce Heuer U. S. patent application Serial No. 144,750, filed May 25, 1937, for Chrome-magnesia refractory and method or Serial No. 145,357, filed May 28, 1937, for Furnace roof, Patent No. 2,155,165, granted April 18, 1939. As the present invention is not primarily concerned with the composition of the refractory mix, which is fully disclosed in the other applications referred to above, the disclosure of said prior applications and patents is incorporated herein by reference and made a part hereof, and will be found to disclose the preparation of the brick mix, the suitable molding pressure and other pertinent information.

The pressure of molding the brick will exceed 1000 pounds per square inch (70.3 kilograms per square centimeter), will preferably exceed 5000 pounds per square inch (351.5 kilograms per square centimeter), and will most desirably exceed 10,000 pounds per square inch (703 kilograms per square centimeter). The dwell in pressure of Russell Pearce Heuer U. S. Patent No. 1,911,152, granted May 23, 1933, for High pressure process of molding refractory brick, will desirably be used in molding the brick of the present invention.

Where the term brick is used herein, it will be understood that any suitable block or other shape is intended, provided with any special contour desired to engage the particular type of hanger, if any.

In carrying out the process of Figure 1, the brick mix will desirably be introduced in the mold space first, in suitably measured quantity, after which the spacer plate will be introduced from the end into position against the upper die and gripped by the suction applied to the upper die. Instead of a suction gripping plate, any other suitable means of holding the spacer plate to the upper die may be used. In Figure 7 a conventional magnetic holder is shown built into the upper die. The detail of the holder may be as illustrated in Bower U. S. Patent No. 2,053,177, granted September 1, 1938, for Work holder. As far as important from the present standpoint, the holder consists of pole pieces 44 and 45 of permanent magnets, alternating in polarity, held in slots in a die face plate 46 of nonmagnetic material, for example, an austenitic ferrous alloy. A handle 47, suitably located at a position where it can not interfere with the function of the die, is provided for release of the magnetism, as will be understood from the said Bower patent. The handle can of course be interconnected with the die for automatic operation.

In some cases it may be more convenient to mold the brick with the U-shaped spacer plate resting upright on the lower die instead of inverted as in Figures 1 and 2. Figures 3 and 4 show the spacer plate having the base 38 of the U resting on the lower die 31 with the arms 37 of the U upstanding. In this construction it is preferable to secure the male projection 41 which forms the hanger slot and hook recess on the upper die 30 as shown. In this form, the suction or magnetic holding means on the upper die is not needed.

To produce the brick according to Figures 3 and 4, the spacer plate is placed in the mold while the dies are separated, with the arms 37 of the U upstanding as shown, and then the mold space inside of the U is filled with a suitable measured charge of basic brick mix. The dies are then relatively moved together to exert pressure upon the mix and mold the brick inside the spacer plate, embedding the interlocking projections or tabs 40 from the spacer plate in the brick. The product as formed by the process of Figures 3 and 4 is suitably identical with that of Figures 1 and 2.

In many cases it will be preferable to mold the brick using two spacer plates, one contacting each die, as in Figure 5 and 6, thus combining in one process the distinctive features of the processes of Figures 1 and 2 and of Figures 3 and 4. Figure 5 shows an upright U spacer plate 34' resting on the lower die 31 and an inverted U spacer plate $34^2$ secured by any suitable means (here suction) to the upper die 30. When the dies are relatively moved toward one another the basic brick mix first fills the space between and within the two spacer plates 34' and $34^2$ as shown in Figure 6, and direct molding pressure is applied to the brick through the base 38' and $38^2$ of the U of each spacer plate. The interlocking projections 40' from each spacer plate are embedded in the formed brick and also projections $40^2$ in the base $38^2$ of the U of the upper spacer plate $34^2$ are suitably embedded.

Experiments indicate that, when pressure is brought to bear by the movable die directly through a spacer plate against a lateral face of the brick, there is a tendency to bow or crinkle the spacer plate unless the spacer plate is free to readjust widthwise as the pressure is applied and removed. This is particularly true where the spacer plate is U-shaped, covering one lateral face and parts of two others, and therefore coming in contact with the sides of the mold as well as the movable die. The spacer plate which contacts the stationary die does not show any pronounced tendency to bow or crinkle. In order to permit readjustment of the width of the spacer plate contacting the movable die, the spacer plate is desirably weakened longitudinally preferably through the center of the base $38^2$ of the U, for the major portion of its length as shown.

In the preferred form of longitudinal weakening, a slot 48 runs longitudinally through the base 38 of the U of the spacer plate $34^2$, being interrupted at intervals for the cross-connections between the two sides of the spacer plate, which, bent inwardly, form the interlocking projections $40^2$. It will be understood that the width of the base $38^2$ of the U in the spacer plate $34^2$ can change somewhat during molding, by change in the width of the slot 48 and of the bending of the interlocking projections $40^2$.

The slot 48 also allows air to escape in the molding process, thus avoiding loss in molding compression through air entrapment. This feature of air release through the slot 48 or some equivalent opening has been found to be important when molding through spacer plates which are opposite as shown in Figures 5 and 6, although not of the same importance when one face on which direct molding pressure is applied has no spacer plate as in the forms of Figures 1 and 2 and Figures 3 and 4.

The arms 37' and $37^2$ of the spacer plates 34' and $34^2$ are preferably shorter than the lateral dimension of the side face of the brick, so that when the brick is compressed the arms cannot meet and cause crushing or bending even though there may be some variation in the charge of brick mix. A line of refractory 49 is ordinarily exposed at the side of the brick.

Having described the molding of the brick, the brick construction will now be considered further.

Figures 8, 9 and 10 show in greater detail the U-shaped spacer plate of Figures 1 to 4. This spacer plate is shown applied to the brick 50 in Figure 14. The base 38 of the U preferably is applied to the rear lateral face of the brick 50, with the arms 37 of the U applied to the side faces of the brick. The interlocking tabs 40 punched out and bent inwardly from the spacer plate are embedded in the side faces of the brick as indicated in Figure 14.

As molded, the brick of Figures 1 to 4 has a front face unprovided with a spacer plate. This is covered by a spacer plate 51 shown in Figures 11 to 13 having resilient prongs at 52 at the top and 53 at the bottom which engage over the upper and lower end faces of the brick (Figure 14). A slot 54 near the upper end of the spacer plate 51 is cut as shown to admit the hanger to the hanger recess, later described.

The preferable construction of suspended furnace roof brick is that indicated in Figure 21. The rear spacer plate 34' for this brick is shown in Figures 15 to 17, in which the base 38' of the U is intended to engage the rear face of the brick 50 and the arms 37' of the U are intended to engage portions of the sides of the brick as shown in Figure 21. Interlocking projections 40' formed from the arms are embedded in the sides of the brick. In some cases the interlocking projections may extend generally horizontal when the brick is suspended as in the construction of Figures 8 to 10, but it is usually preferred to have these interlocking projections extend vertically when the brick is suspended as shown in Figures 15 to 20.

The spacer plate contacting the front face of the brick 50 is shown in Figures 18 to 20. The base $38^2$ of its U contacts the front face of the brick and has the usual cut away portion 54 for the hanger. The side arms $37^2$ of the U cover portions of the sides of the brick and have vertically extending interlocking projections 40' as shown in Figure 21, which are embedded in the sides of the brick. The interlocking projections $40^2$ connecting the sides of the slot 48 are seen embedded in the front face of the brick.

The upper corner of the side arm of the U is preferably cut away as seen at 55 in Figures 20 and 21 to avoid unduly stressing the brick corner during molding.

One of the important functions of the spacer is to prevent a broken or spalled fragment of the brick from dropping out of the roof. In order to perform this function adequately, the spacer should oxidize rather than melt out. While spacers made of materials other than iron and steel, comprising for example copper or aluminum or alloys of the two, may be used in furnaces of lower temperature, it is contemplated that for high temperature work, for example operation in open hearth steel furnaces at temperatures in excess of 2910° F. (1600° C.), the spacer material will be iron or steel.

It is also important that the spacers be not unduly thick, as this will encourage melting out. In general the spacers should not be thicker than 5/64 inch (0.20 centimeter) and preferably not thicker than 3/64 inch (0.12 centimeter). Sheet iron in the "as rolled" condition will desirably be used.

It will of course be understood that the brick employed in the present invention must not be acid (silica), as acid brick would flux with the iron oxide of the spacer and destroy the roof or wall.

It will be evident that the use of spacers molded as part of the brick presents the very real advantage that the spacer, instead of sticking out beyond the outside limits of the brick, can and desirably will lie wholly within the confines of the brick. Thus, where a particular face of the brick is partly covered by a spacer plate and partly uncovered, the outside of the spacer plate and the refractory of the uncovered portion are preferably flush, so that the side of the brick will not present a shoulder where the spacer plate is encountered. On the other hand, if desired, the spacer plate may protrude beyond the line of the unencased refractory for a distance less than the spacer plate thickness, in case a particular face of the brick is partially encased and partially unencased.

It will be evident that the brick of the present invention will be used unfired, as firing prior to installation in the furnace roof or wall would spoil the spacers.

In view of my invention and disclosure variations and modifications to meet individual whim or particular need will doubtless become evident to others skilled in the art to obtain part or all of the benefits of my invention without copying the process shown, and I, therefore, claim all such in so far as they fall within the reasonable spirit and scope of my invention.

Having thus described my invention, what I claim as new and desire to secure by Letters Patent is:

1. The process of molding basic refractory brick covered with oxidizable metallic spacer plates provided with inwardly projecting tongues, which comprises relatively moving U-shaped spacer plates having open U sides facing toward one another and provided with inwardly projecting tongues, together with a basic refractory brick mix in position to be molded, applying direct molding pressure to the brick mix through the spacer plates by dies acting upon the outsides of the spacer plates and concurrently interlocking the inwardly projecting tongues from the spacer plates with the brick mix.

2. The process of producing a basic refractory brick covered by U-shaped oxidizable metallic spacer plate in a mold, which comprises positioning one U spacer plate upright in the bottom of the mold, positioning the other U spacer plate inverted and with its arms depending from the top of the mold, charging a basic refractory brick mix within the upright U, and relatively moving the U's toward one another to force the arms of the inverted U around the brick mix and to apply molding pressure to the brick mix between the U's.

3. The process of producing a basic refractory brick covered with U-shaped oxidizable metallic spacer plates in a mold, which comprises positioning one U spacer plate upright in the bottom of the mold, positioning the other U spacer plate inverted and with its arms depending from the top of the mold, both of said U spacer plates being provided with inwardly projecting tongues, charging a basic refractory brick mix within the upright U, and relatively moving the U's toward one another to force the arms of the inverted U around the brick mix and to apply molding pressure to the brick mix between the U's, and concurrently interlocking the inwardly projecting tongues from the arms of the U's with the brick mix.

4. The process of molding an encased basic refractory brick, which comprises longitudinally weakening a U-shaped oxidizable metallic spacer plate, applying molding pressure to a brick mix against the outside of the spacer plate and to one lateral face of the brick and thereby laterally adjusting the spacer plate transversely to the direction of molding and interlocking the spacer plate with the brick during the molding.

5. The process of producing a basic refractory brick provided with a U-shaped oxidizable metallic spacer plate, which comprises longitudinally weakening the base of the U of the spacer plate for a major portion of the length of the spacer plate, applying molding pressure to a brick mix through the base of the U with the arms of the U at least partially surrounding the sides of the brick mix, and thereby laterally adjusting the width of the base of the U under the molding pressure application and concurrently interlocking the arms of the U with the brick mix.

6. The process of producing a basic refractory brick covered with oxidizable metallic spacer plates, which comprises applying molding pressure to the top of an unmolded basic refractory brick mix through a spacer plate provided with slots extending longitudinally for a major portion of the length of the brick, concurrently interlocking the spacer plate with the brick and during the molding venting air through the slots in the spacer plate.

7. The process of producing a basic refractory brick covered with oxidizable metallic spacer plates, which comprises moving in against an unmolded basic refractory brick mix, U-shaped spacer plates having relatively facing open U's and having slots extending for a major portion of the length of the base of one of the U's, concurrently venting the air from the mix through the slots and interlocking the spacer plates with the brick mix by the molding.

8. The method of producing a rectangular basic refractory brick covered by a rectangular open-ended U-shaped oxidizable metallic spacer plate extending over one lateral face of the brick and parts of two others, and interconnected with the brick by tongues extending inwardly from the sides of the U, which comprises positioning the spacer plate and the brick mix in a mold with the brick mix filling the interior of the U and with the tongues on the sides of the U extending into the brick mix, and molding the brick within the spacer plate by molding pressure applied between the base of the U and the opposing flat face of the brick while concurrently embedding the tongues in the lateral faces of the brick mix.

9. The method of producing a basic refractory brick covered by a U-shaped oxidizable metallic spacer plate having tongues extending inwardly, using an upper die and a mold, which comprises placing a brick mix in the mold, positioning the spacer plate on the face of the upper die with the U inverted and the sides of the U substantially in line with the sides of the mold, forcing the sides of the U into the brick mix to a position in which the mix fills the space inside the U, and applying molding pressure to the brick mix through the base of the U to form the brick and to embed the tongues in the brick mix.

10. The process of producing a basic refractory brick covered by oxidizable metallic spacer plates in a mold, which comprises positioning upright in the bottom of the mold one U-shaped spacer plate provided with means for interlocking with the brick mix, positioning at the top of the mold another spacer plate provided with means for interlocking with the brick mix, having a basic refractory brick mix within the U, and relatively moving the plates toward one another to interlock the upper and lower plates with the brick mix and to apply molding pressure to the brick mix between the upper and lower plates.

RUSSELL PEARCE HEUER.